US011046134B2

(12) United States Patent
Raffaelli

(10) Patent No.: US 11,046,134 B2
(45) Date of Patent: Jun. 29, 2021

(54) SUSPENSION GROUP FOR MOTOR VEHICLE, WHEEL GROUP FOR MOTOR VEHICLE, FRONT END OF A MOTOR VEHICLE AND MOTOR VEHICLE THEREOF

(71) Applicant: PIAGGIO & C. S.P.A., Pisa (IT)

(72) Inventor: Andrea Raffaelli, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 72 days.

(21) Appl. No.: 16/465,163

(22) PCT Filed: Dec. 7, 2017

(86) PCT No.: PCT/IB2017/057729
§ 371 (c)(1),
(2) Date: May 30, 2019

(87) PCT Pub. No.: WO2018/104906
PCT Pub. Date: Jun. 14, 2018

(65) Prior Publication Data
US 2019/0329616 A1   Oct. 31, 2019

(30) Foreign Application Priority Data

Dec. 7, 2016  (IT) .......................... 102016000124367

(51) Int. Cl.
*B60G 7/00*   (2006.01)
*B60G 13/00*  (2006.01)
(Continued)

(52) U.S. Cl.
CPC .............. *B60G 3/04* (2013.01); *B60G 7/001* (2013.01); *B60G 13/005* (2013.01); *B62K 5/00* (2013.01);
(Continued)

(58) Field of Classification Search
CPC ........ B60G 3/04; B60G 7/001; B60G 13/005; B60G 2300/122; B60G 3/20;
(Continued)

(56) References Cited

U.S. PATENT DOCUMENTS 2,689,747 A * 9/1954 Kolbe .................. B60G 21/007
                                              280/124.103
4,444,406 A    4/1984 Isono
(Continued)

FOREIGN PATENT DOCUMENTS

CN   105313628 A   2/2016
CN   105392695 A   3/2016
(Continued)

OTHER PUBLICATIONS

International Search Report for corresponding application PCT/IB2017/057729 filed on Dec. 7, 2017; dated Mar. 27, 2018.
(Continued)

*Primary Examiner* — Karen Beck
(74) *Attorney, Agent, or Firm* — Cantor Colburn LLP

(57) ABSTRACT

A suspension group for a motor vehicle, wherein said suspension group includes: a wheel guide, which extends along a longitudinal axis, which includes a wheel attachment for connection to a rotation pin of a wheel having a rotation axis orthogonal to said longitudinal axis, wherein the wheel guide extends between a first end and a second end, opposite the first end, a support arm functionally connected to the wheel guide respectively by means of: a first crank rotatably connected at said second end to the wheel guide and to the support arm; a second crank rotatably connected at said first end to the wheel guide and to the support arm, wherein the wheel guide elements, the support arm and the first and second crank define a suspension quadrilateral, wherein, between at least two of said elements chosen between the
(Continued)

wheel guide, the support arm, the first and the second crank, a shock absorber group is interconnected in such a way that the shock absorber group varies its extension as the movement of the suspension quadrilateral varies.

20 Claims, 15 Drawing Sheets

(51) Int. Cl.
  *B60G 3/04* (2006.01)
  *B62K 5/00* (2013.01)
  *B62K 5/027* (2013.01)
  *B62K 5/08* (2006.01)

(52) U.S. Cl.
  CPC .......... *B62K 5/027* (2013.01); *B60G 2204/30* (2013.01); *B60G 2300/122* (2013.01); *B62K 5/08* (2013.01); *B62K 2005/001* (2013.01)

(58) Field of Classification Search
  CPC ........ B60G 2204/30; B60G 3/01; B60G 3/26; B62K 5/00; B62K 5/027; B62K 5/08; B62K 2005/001; B62K 25/00; B62K 5/10; B62D 9/02
  See application file for complete search history.

(56) References Cited

U.S. PATENT DOCUMENTS

| | | | | |
|---|---|---|---|---|
| 4,515,390 A * | 5/1985 | Greenberg | ............... | B60G 3/26 180/903 |
| 5,580,089 A * | 12/1996 | Kolka | ...................... | B60G 3/01 280/124.103 |
| 5,833,258 A | 11/1998 | Maestripieri | | |
| 6,250,649 B1 * | 6/2001 | Braun | ................ | B60G 17/0162 280/124.106 |
| 6,311,795 B1 * | 11/2001 | Skotnikov | .......... | B60G 17/0152 180/8.3 |
| 6,467,783 B1 * | 10/2002 | Blondelet | ................ | B60G 3/20 280/124.106 |
| 7,234,708 B2 * | 6/2007 | Blondelet | ................ | B60G 3/20 280/5.521 |
| 8,128,110 B2 * | 3/2012 | Sacli | ...................... | B60G 21/05 280/124.106 |
| 2002/0190494 A1 * | 12/2002 | Cocco | ...................... | B62K 5/10 280/124.135 |
| 2018/0222268 A1 * | 8/2018 | Raffaelli | .................. | B62K 5/08 |
| 2019/0375262 A1 * | 12/2019 | Raffaelli | .................. | B62K 5/08 |
| 2020/0062330 A1 * | 2/2020 | Angelin | ................ | B62K 25/08 |
| 2020/0180375 A1 * | 6/2020 | Sardes | ................... | B60G 3/207 |
| 2021/0031867 A1 * | 2/2021 | Raffaelli | .................. | B60G 3/01 |

FOREIGN PATENT DOCUMENTS

| | | | | |
|---|---|---|---|---|
| CN | 205439856 U | 8/2016 | | |
| CN | 106114103 A | 11/2016 | | |
| CN | 101670757 A | 3/2017 | | |
| CN | 202557707 U | 11/2018 | | |
| EP | 0030306 A2 | 6/1981 | | |
| EP | 3153388 A1 | 4/2017 | | |
| GB | 163504 | 5/1921 | | |
| JP | 6192983 A | 5/1986 | | |
| WO | WO-2015151064 A1 * | 10/2015 | ............... | B60G 3/20 |
| WO | 2017021905 A1 | 2/2017 | | |
| WO | WO-2018116212 A1 * | 6/2018 | ............... | B62K 5/01 |

OTHER PUBLICATIONS

Written Opinion for corresponding application PCT/IB2017/057729 filed on Dec. 7, 2017; dated Mar. 27, 2018.

Chinese Office Action and Search Report for corresponding application 2017800755677 filed Dec. 7, 2017; Report dated Jun. 29, 2020.

* cited by examiner

SUSPENSION GROUP FOR MOTOR VEHICLE, WHEEL GROUP FOR MOTOR VEHICLE, FRONT END OF A MOTOR VEHICLE AND MOTOR VEHICLE THEREOF

SCOPE OF THE INVENTION

The present invention relates to a suspension group of a wheel of a motor vehicle, for example a two- or three-wheel motor vehicle.

Moreover, the present invention relates to a wheel group of a motor vehicle which integrates said suspension group, both in a motor vehicle front end and in a motor vehicle thereof.

PRIOR ART

Various suspension solutions applied to the wheel of a motor vehicle are known. The suspensions must guarantee a predetermined stiffness to the wheel support and, at the same time, provide reduced dimensions and weight to improve the dynamic behavior of the vehicle, particularly in three-wheeled motor vehicles. The latter comprise a drive wheel at the rear and two wheels at the front of the steering and tilting type. The rear wheel has the purpose of providing the drive torque, while the front wheels—substantially parallel to each other—provide the directionality of the vehicle.

The front wheels are kinematically connected to each other by means of kinematic systems which ensure that the same will roll and/or steer synchronously and symmetrically, for example, via the interposition of articulated quadrilaterals.

A suspension group with a quadrilateral structure is known in the name of the same applicant which comprises a wheel guide equipped with a shock absorber group integrated inside a jacket. The wheel guide is in turn connected to a support arm by means of: a crank, hinged at respective ends of the wheel guide and of the support arm, and a guide rod, keyed to a head of the shock absorber group slidably coupled inside the jacket. The travel of the guide rod is defined by a slot made on the jacket. The head of the shock absorber group forms a cylinder-piston coupling and acts as an axial guide for the sliding of the shock absorber group.

The aforementioned solution, while being functionally valid, has some drawbacks. The head portion is open towards the outside through the slot and, therefore, the cylinder-piston coupling is subject to the accumulation of dirt; this aspect may cause deterioration of the seal and of the functionality in general.

The need to solve the aforementioned disadvantage is therefore perceived.

The need to improve the performance of the suspension group is also perceived in terms of: better control of the trajectory of the wheel fixed to the wheel guide of the shock absorber, greater strength of the suspension group, and production cost.

SUMMARY OF THE INVENTION

It is therefore an object of the present invention to provide a motor vehicle suspension group which is improved in terms of dynamic response and production costs with respect to the solution according to the prior art.

It is another object of the present invention to provide a wheel group which comprises said suspension group which achieves the same purposes.

It is also an object of the present invention to provide a motor vehicle front end and a motor vehicle thereof which achieve the same purposes.

These and other objects are achieved by a suspension group for a motor vehicle according to claim 1.

DESCRIPTION OF THE DRAWINGS

The present invention will be illustrated hereinafter with the following description of an embodiment thereof, made by way of a non-limiting example, with reference to the accompanying drawings wherein:

FIG. 2b shows an enlarged perspective view of the front end of the motor vehicle of FIG. 2a;

Figure 1A:
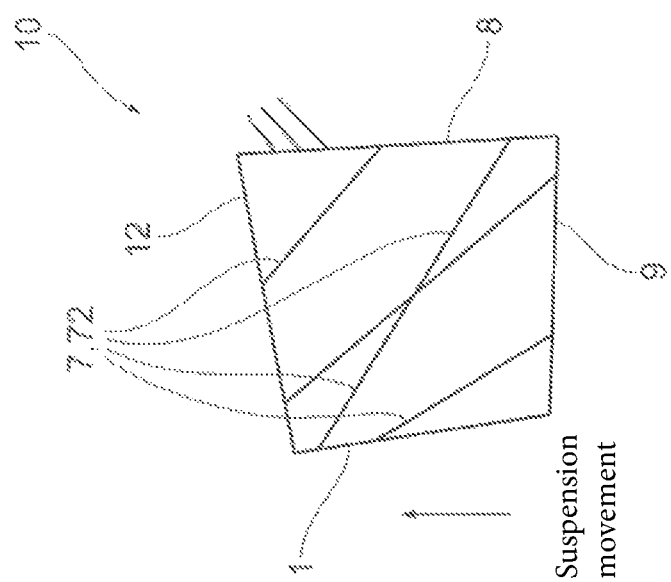
FIGS. 1a-1b are schematic views of possible configurations of suspension groups in accordance with the present invention.

The elements or parts of elements in common between the embodiments described hereinafter will be indicated at the same numerical references.

DETAILED DESCRIPTION

With reference to the aforementioned figures, a total schematic view of a motor vehicle according to the present invention is collectively indicated at 100.

For the purposes of the present invention, the term "motor vehicle" is to be considered in the broad sense, comprising any motorcycle having at least three wheels, i.e., two front wheels 102,102a, as better described below, and at least one rear wheel 103. Thus, so-called quadricycles are also included in the definition of a motor vehicle, having two wheels on the front end and two wheels on the rear axle.

The motor vehicle 100 comprises a chassis 101 extending from a front end 108, supporting at least two front wheels 102, 102a, to a rear axle 109, supporting one or more rear wheels 103.

Figure 2A:
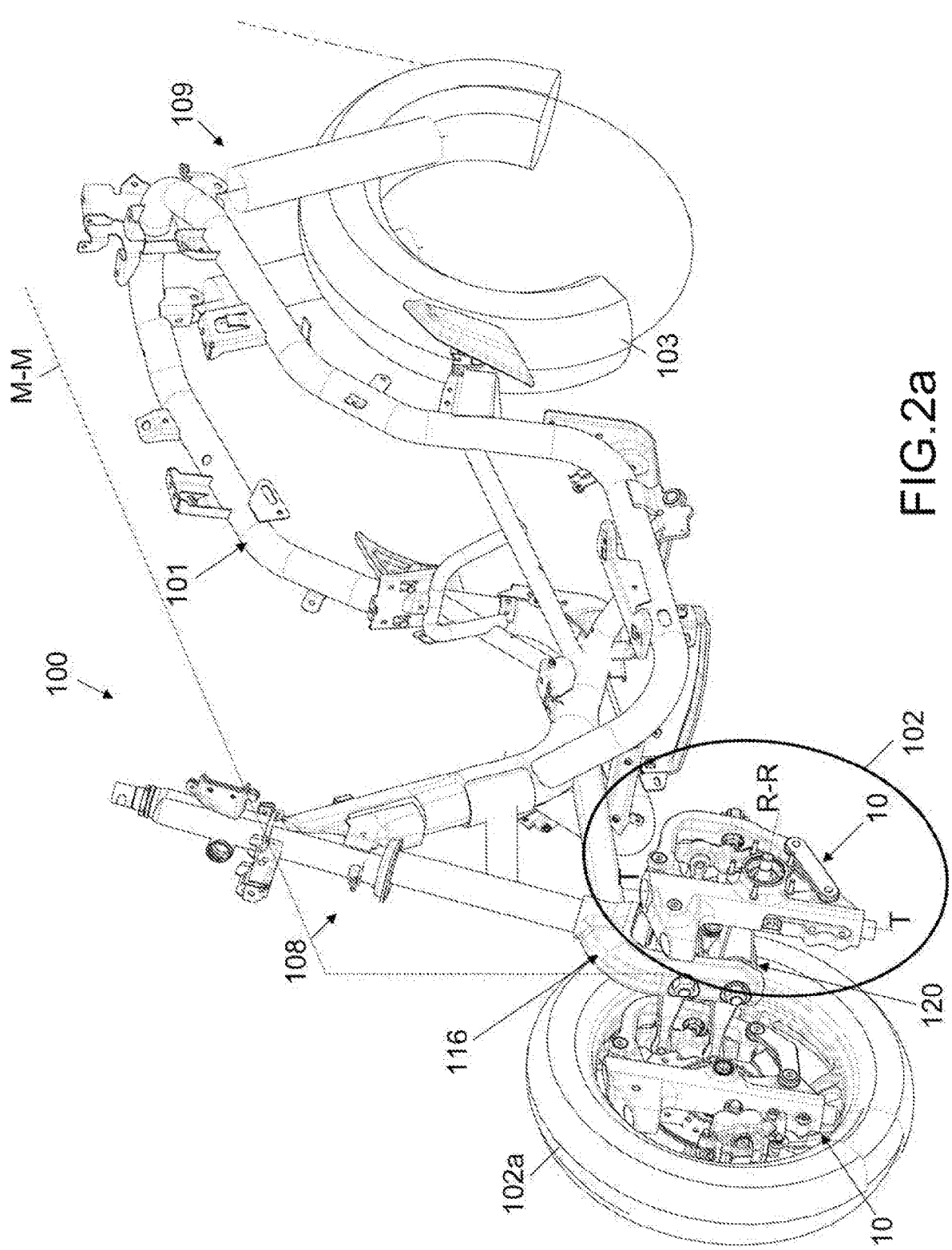
FIG. 2a shows a perspective view of a motor vehicle which comprises at the front end a pair of wheels provided with a suspension group, according to the present invention.

Even if not shown, a right front wheel 102, shown schematically in FIG. 2*a*, and a left front wheel 102*a* with respect to a driver on board the vehicle according to the direction of travel are identified. The wheels 102,102*a* are disposed to the left and to the right of a centerline plane M-M of the motor vehicle, relative to the observation point of a driver thereof.

For the purposes of the present invention, the chassis 101 of the motor vehicle may be of any shape and size and may, for example, be of the lattice-type, box-type, single- or double-cradle, and so on.

In particular, the front end 108 of the motor vehicle 100 comprises a front end frame 116 and a pair of front wheels 102, 102*a*, kinematically connected to the front end chassis 116 by a rolling articulated quadrilateral 120. Said rolling articulated quadrilateral 120 allows the front wheels 102, 102*a* to roll, that is to say, incline with respect to the perpendicular to the ground.

The front end 108 comprises, at each front wheel 102, 102*a*, a suspension group 10.

Figure 3:
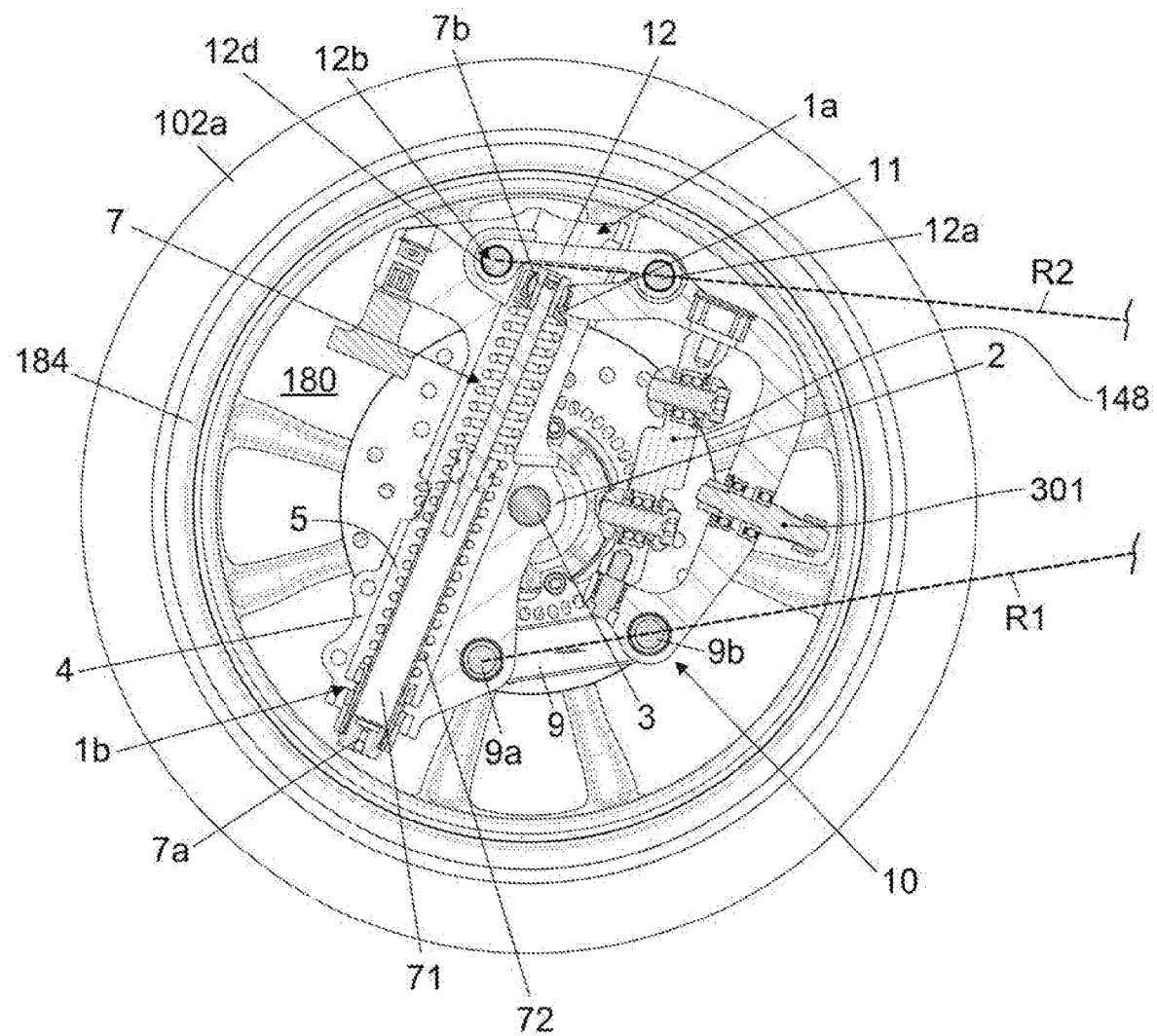
FIG. 3 is a sectional view of a suspension group, according to the present invention, applied to a corresponding wheel.
Figure 4:
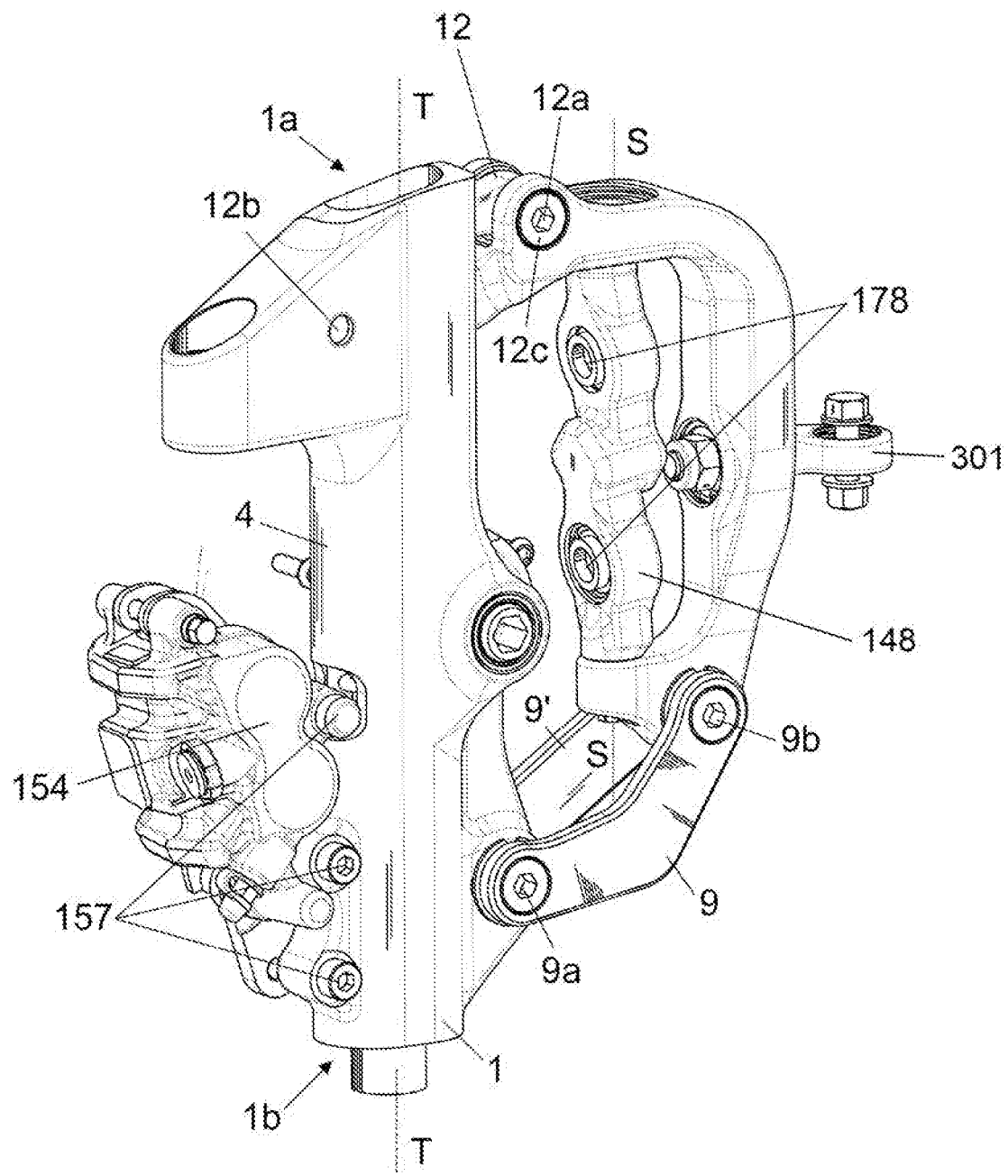
FIG. 4 shows a perspective view of the suspension group, in a first extended configuration of the shock absorber group.

As better shown in FIGS. 3 and 4, the suspension group 10 comprises a wheel guide 1, which extends along a longitudinal axis T-T. The wheel guide 1 provides a wheel attachment 2 for connection to a rotation pin 3 of a wheel 102,102*a* with a rotation axis R-R orthogonal to the longitudinal axis T-T.

In particular, the wheel guide 1 extends between a first end 1*a* and a second end 1*b*, opposite to each other.

The suspension group 10 further comprises a shock absorber group 7 which extends from a base portion 7*a* to a head portion 7*b*, opposite to the base portion 7*a*, said base and head portion being mutually movable and connected to at least two elements between the wheel guide 1, a support arm 8, a first crank 9 and a crank 12, better described hereinafter.

For example, said shock absorber group 7 comprises resilient means 72 and a damper 71.

The suspension group 10 comprises a support arm 8 functionally connected to the wheel guide 1 respectively by means of a first crank 9 and a second crank 12.

The first crank 9 is pivotally connected at said second end 1*b* to the wheel guide 1, for example by means of a first hinge 9*a*, and to the support arm 8, for example by means of a second hinge 9*b*.

The second crank 12 is pivotally connected at said first end 1*a* to the wheel guide 1 and to the support arm 8.

For example, the second crank 12 is pivotally connected at said first end 1*a*, by means of a third hinge 12*a* disposed on the support arm 8, and by means of a fourth hinge 12*b* disposed on the wheel guide 1, According to one embodiment, the first crank 9 is pivotally connected at said second end 1*b*, by means of a first hinge 9*a* disposed on the wheel guide 1, and a second hinge 9*b* disposed on the support arm 8.

The wheel guide 1, the support arm 8 and the first 9 and second 12 crank define collectively an articulated suspension quadrilateral. Each wheel is pivotally connected to its own articulated suspension quadrilateral. The suspension quadrilaterals are connected to each other by means of the rolling articulated quadrilateral 120. The rolling articulated quadrilateral 120 then connects the suspension quadrilaterals to the chassis of the motor vehicle. Advantageously, between at least two of said elements chosen between the wheel guide 1, the support arm 8, the first crank 9 and the second crank 12, a shock absorber group 7 is interconnected in such a way that the shock absorber group 7 varies its extension when the movement of the suspension quadrilateral varies.

In general, such shock absorber group comprises resilient means 72, typically but not exclusively a coil spring or a torsion bar, and a damper 71. The resilient means 72 and the damper 71 are not necessarily disposed between the same two elements chosen between the wheel guide 1, the support arm 8, the first crank 9 and the second crank 12. Therefore, the resilient means 72 and the damper 71, if integrated together, connect the same elements of the suspension quadrilateral, while if disengaged, may connect the same elements of the quadrilateral or distinct pairs of elements of the suspension quadrilateral.

According to one embodiment, the shock absorber group is provided between said first crank 9 and said second crank 12.

According to one embodiment, the shock absorber group 7 is provided between said first crank 9 and said support arm 8.

According to one embodiment, the shock absorber group 7 is provided between said first crank 9 and said wheel guide 1.

According to one embodiment, the shock absorber group 7 is provided between said second crank 12 and said support arm 8.

According to one embodiment, the shock absorber group 7 is provided between said second crank 12 and said wheel guide 1.

According to one embodiment, the shock absorber group 7 is provided between said support arm 8 and said wheel guide 1.

According to one embodiment, the resilient means 72 are disposed so as to compress with the increasing load on the wheel 102,102*a*: this condition is illustrated schematically in FIG. 1*a*, wherein various possible inclinations/arrangements of resilient means 72 are illustrated which are compressed as described.

Figure 1B:
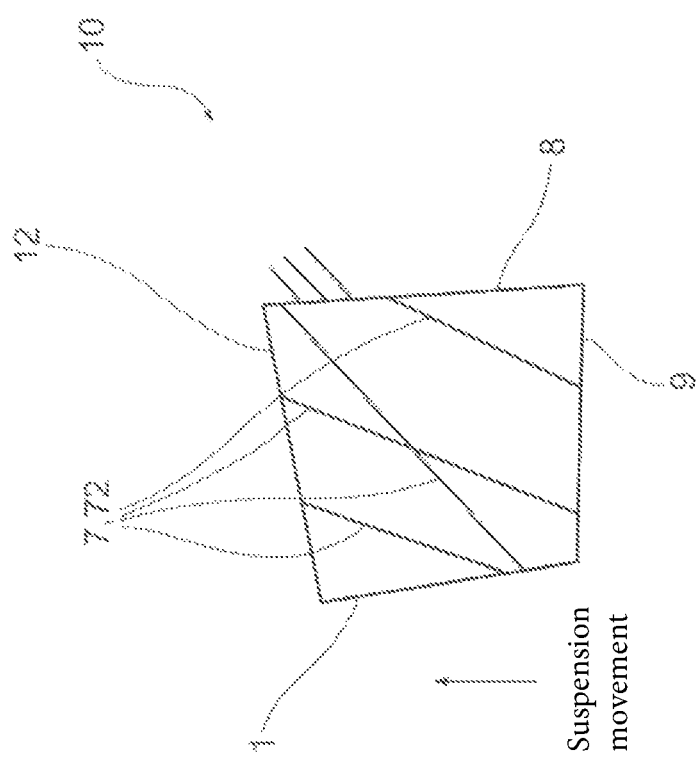

According to a further possible embodiment, the resilient means 72 are disposed so as to extend with the increasing load on the wheel 102,102*a*: this condition is illustrated schematically in FIG. 1*b*, wherein various possible inclinations/arrangements of resilient means 72 are illustrated which are extended as described.

According to one embodiment, the suspension quadrilateral 10 is contained within a volume 180 defined by a rim 184 of said wheel 102,102*a*, i.e. the empty space which, according to a radial direction, is found inside the rim 184. The shock absorber 7 may be arranged at least partially outside said volume 184, according to an axial direction. Preferably, the shock absorber 7, in this configuration, is at least partially cantilevered or disposed outwardly with respect to the volume 180.

For example, in such at least partially cantilevered configuration, the shock absorber is preferably doubly hinged to said first and second crank 9,12, so as to rotate with the latter. In other words, in this configuration the shock absorber has a floating anchor.

Preferably, the shock absorber 7 is disposed completely outwardly or cantilevered with respect to the volume 180, from an inner side of the wheel, facing towards said centerline plane M-M.

Due to this positioning of the shock absorber, it is possible to reduce the dimensions of the stub axle of the wheel, and therefore also the relative costs, since a smaller stub axle results in less material and less processing. This arrangement of the suspension group also allows the construction of a vehicle with a narrower track width.

Moreover, the shock absorber 7 has simplified couplings at the ends 7a,7b and its external positioning allows a greater margin of maneuverability for its size, since its hydraulic body and the spring do not constrain the dimensions of the passage inside the stub axle.

Moreover, due to the positioning outside of the volume 180, it is possible to obtain a behavior with a high geometric progressivity which allows springs with a single elastic coefficient to be used.

The resilient means 72 typically comprise coil springs with coils wound according to a constant or even variable pitch.

For example, the resilient means are springs disposed coaxially with the shock absorber 7, in a known manner.

The resilient means 72 may be mounted either in series or in parallel with respect to the shock absorber 7.

According to one embodiment, the resilient means 72 are disposed parallel to the shock absorber 7.

According to a possible further embodiment (FIGS. 12-17), the first and second hinges 9a,9b of the first crank 9 are rigid or interlocking so that the first crank 9 behaves as a torsion bar carrying out the function of said resilient means 72. Moreover, preferably, in this configuration the shock absorber 7 comprises only a damper 71.

It is also possible to provide for the third and fourth hinges 12a,12b of the second crank 12 being of a rigid or interlocking type so that the second crank 12 behaves as a torsion bar, providing the function of said resilient means. Moreover, preferably, in such configuration the shock absorber 7 comprises only a damper 71.

The use of said first and second cranks 9,12 acting as torsion bars may be either reciprocating or concurrent; in other words it is possible to provide a single torsion bar (as a first or second crank) or both cranks may act as torsion bars.

Due to the use of the torsion bars, it is possible to eliminate rotoidal torques, whether they are bearings or bushings, with a considerable advantage in terms of costs.

Furthermore, by eliminating the classic helical spring, especially if contained within the jacket 4, the overall dimensions are drastically improved because the size of the jacket itself may be reduced and/or the body of the shock absorber may be increased to improve the behavior of the hydraulic part (i.e. damping) of the suspension.

Moreover, since the torsion bar is screwed between the support arm 8 and the jacket 4 or in any case the head portion 7b of the shock absorber 7, the play of the ball bearings normally used to guide the rotation is not perceived.

As seen, according to a possible embodiment, the wheel guide 1 further comprises a tubular jacket 4, i.e. a portion of hollow tube, which defines a housing space 5, hereinafter space 5.

Figure 5:
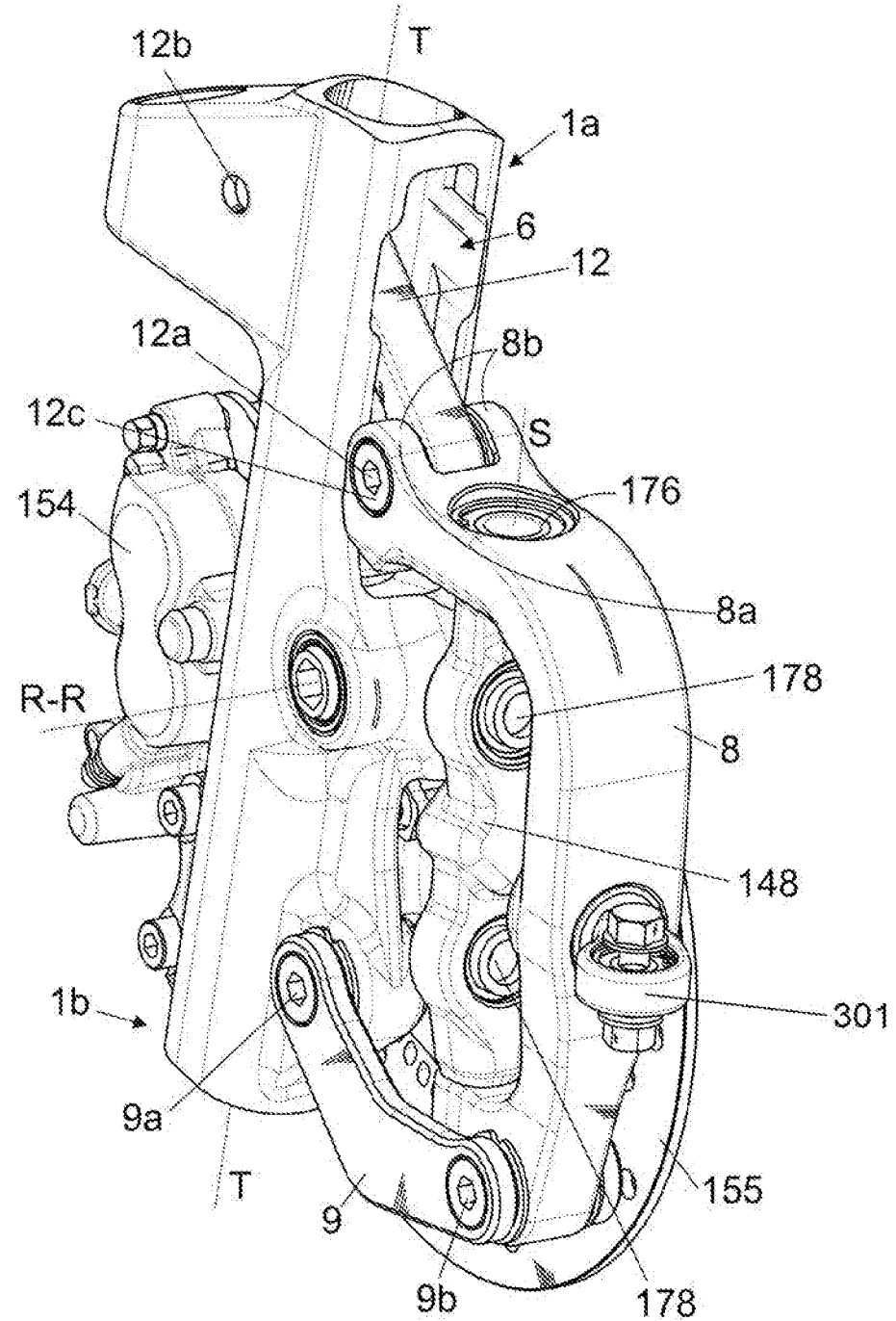
FIG. 5 shows a perspective view of the suspension group of FIG. 4, in a second compressed configuration of the shock absorber group.
Figure 6:
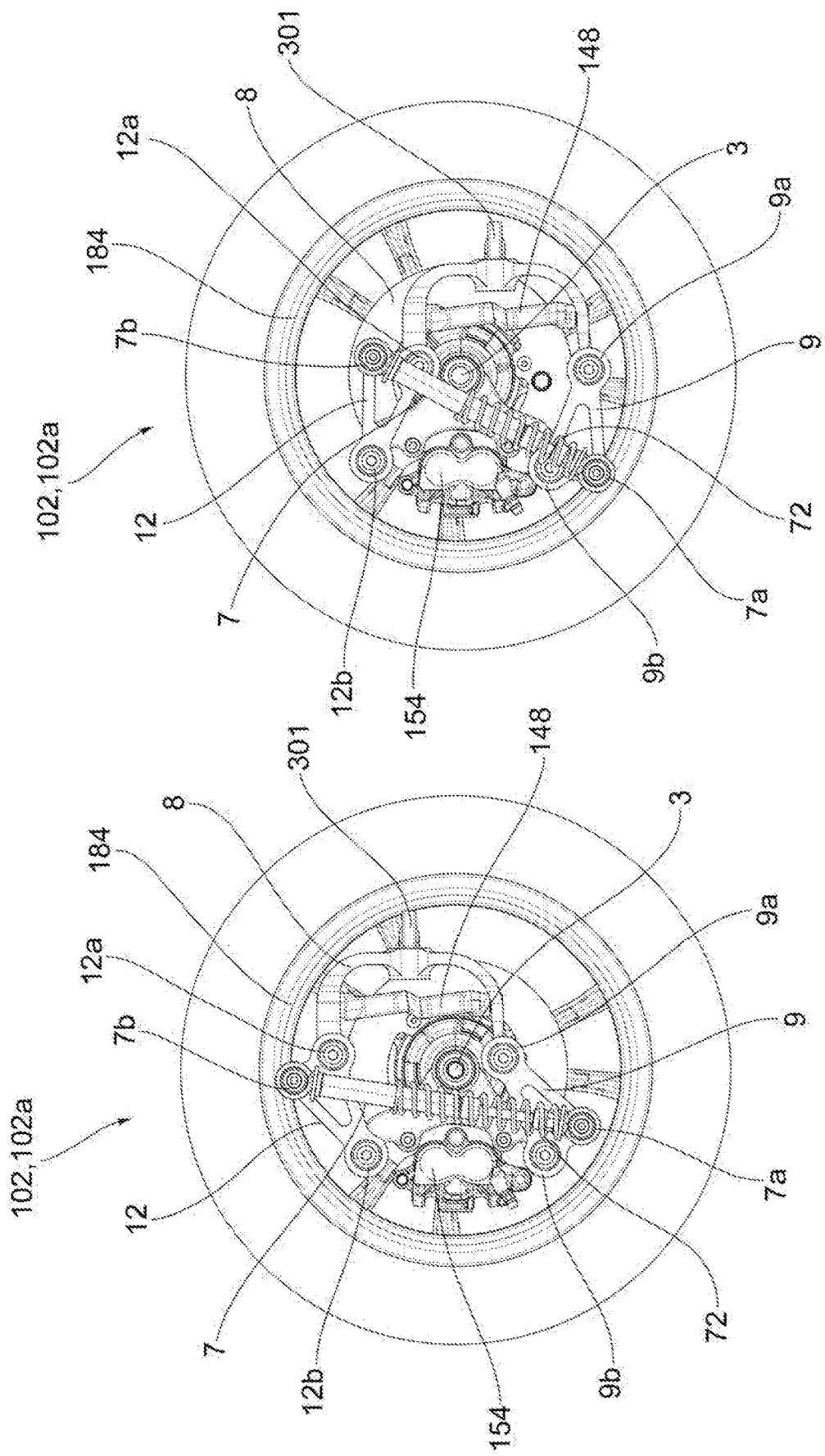
FIGS. 6a-6b show views, respectively in an extended and compressed configuration, of a suspension group according to a further embodiment of the present invention.
Figure 7:
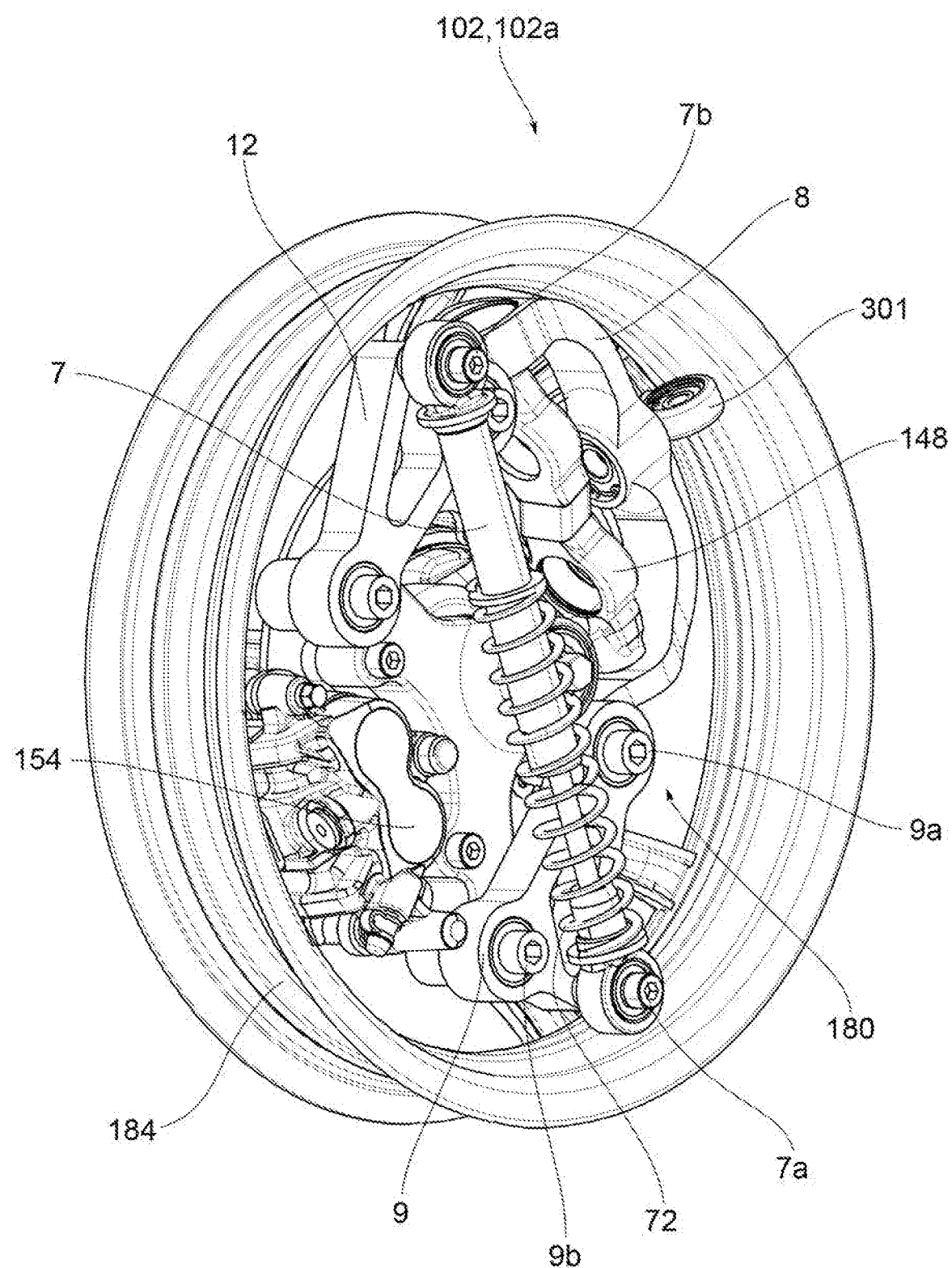
FIG. 7 is a perspective view of the suspension group shown in FIGS. 6a and 6b.
Figure 8:
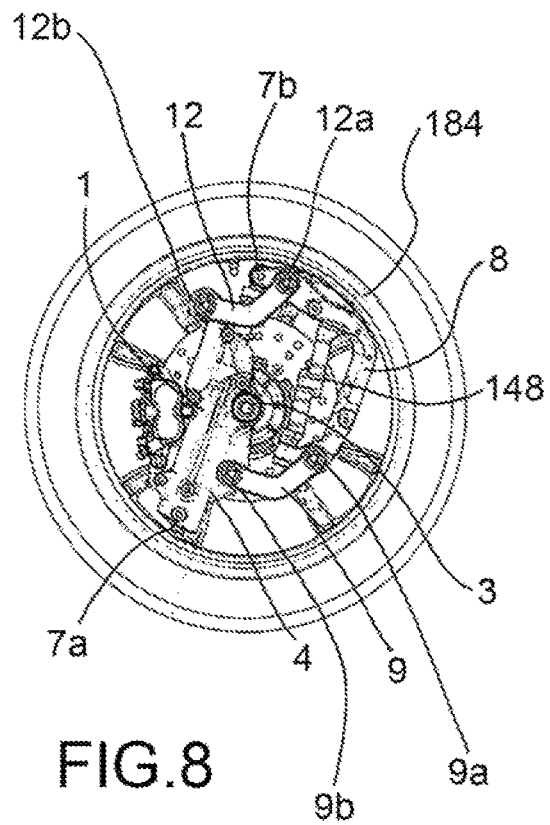
FIGS. 8, 9, 10, 11 show views of further embodiments of a suspension group in accordance with the present invention.
Figure 9:
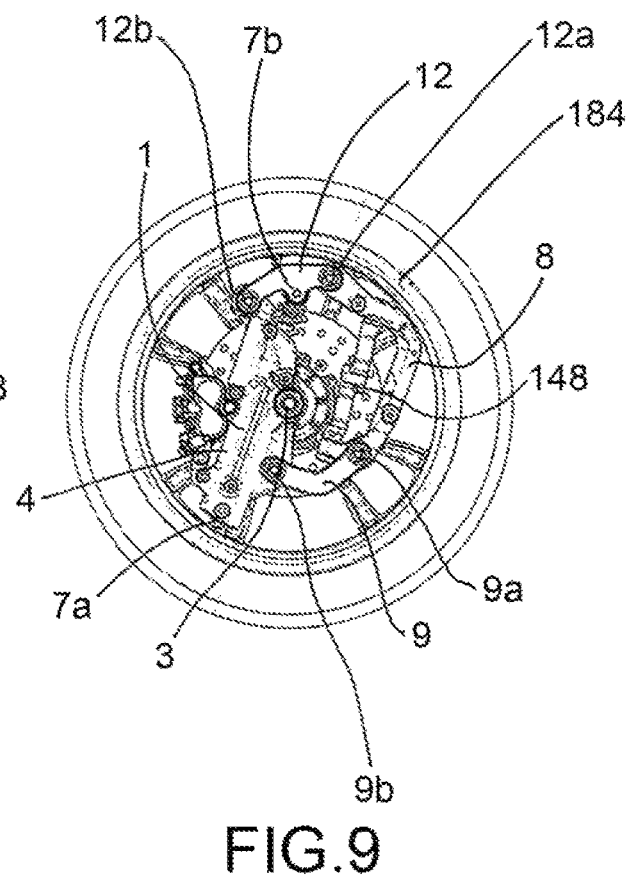
Figure 10:
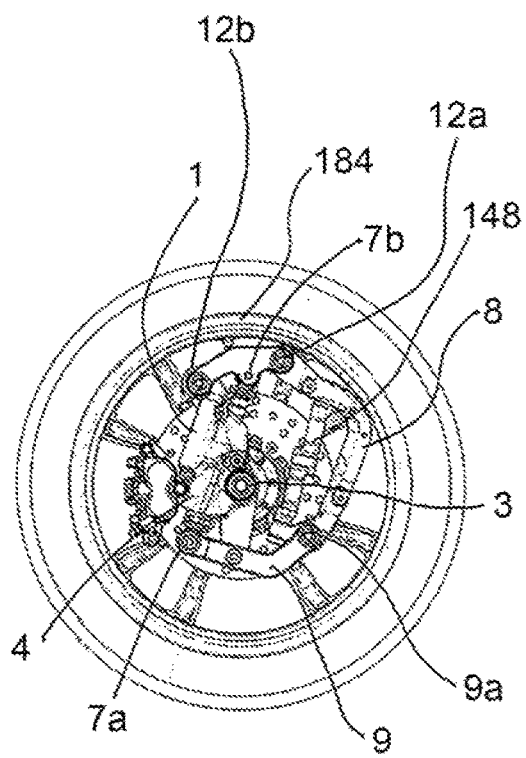
Figure 11:
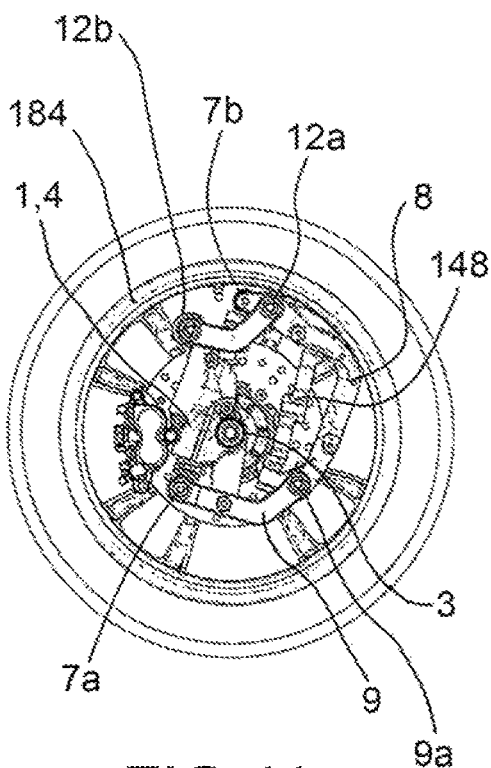
Figure 12:
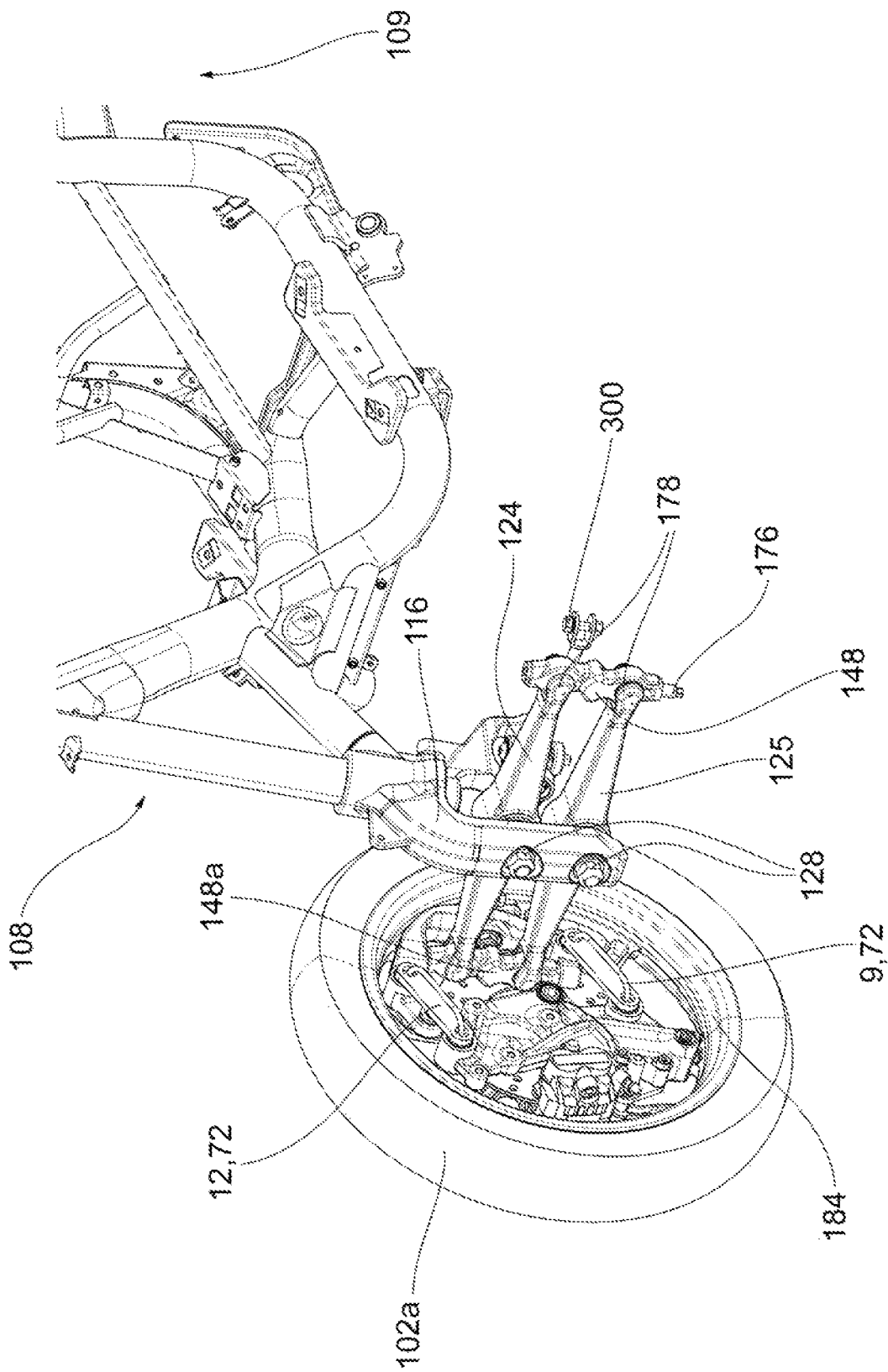
FIG. 12 shows a partial perspective view of a motor vehicle comprising a front end according to a further embodiment of the present invention.
Figure 13:
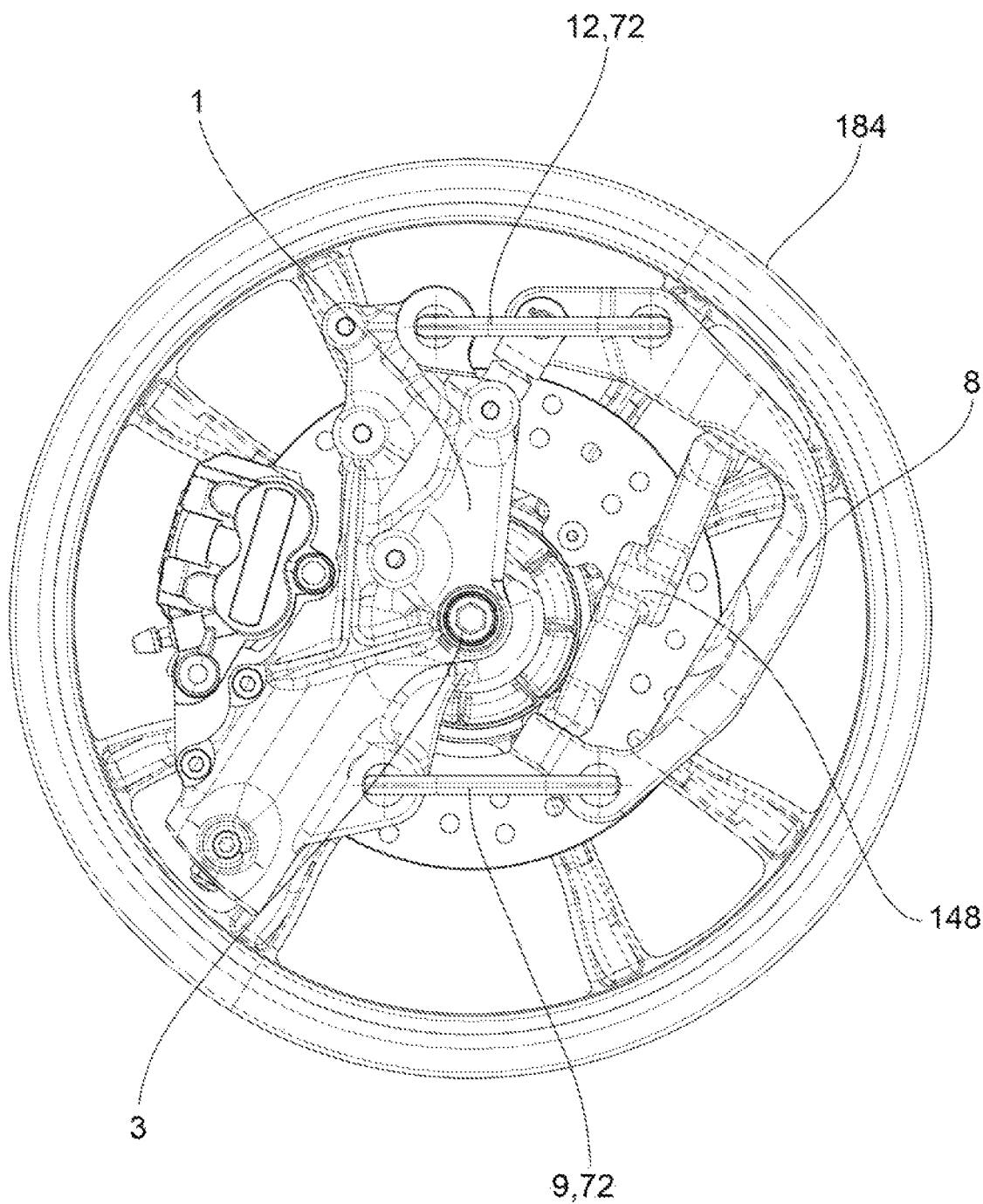
FIG. 13 shows a front view of a front wheel of the motorcycle of FIG. 12.
Figure 14:
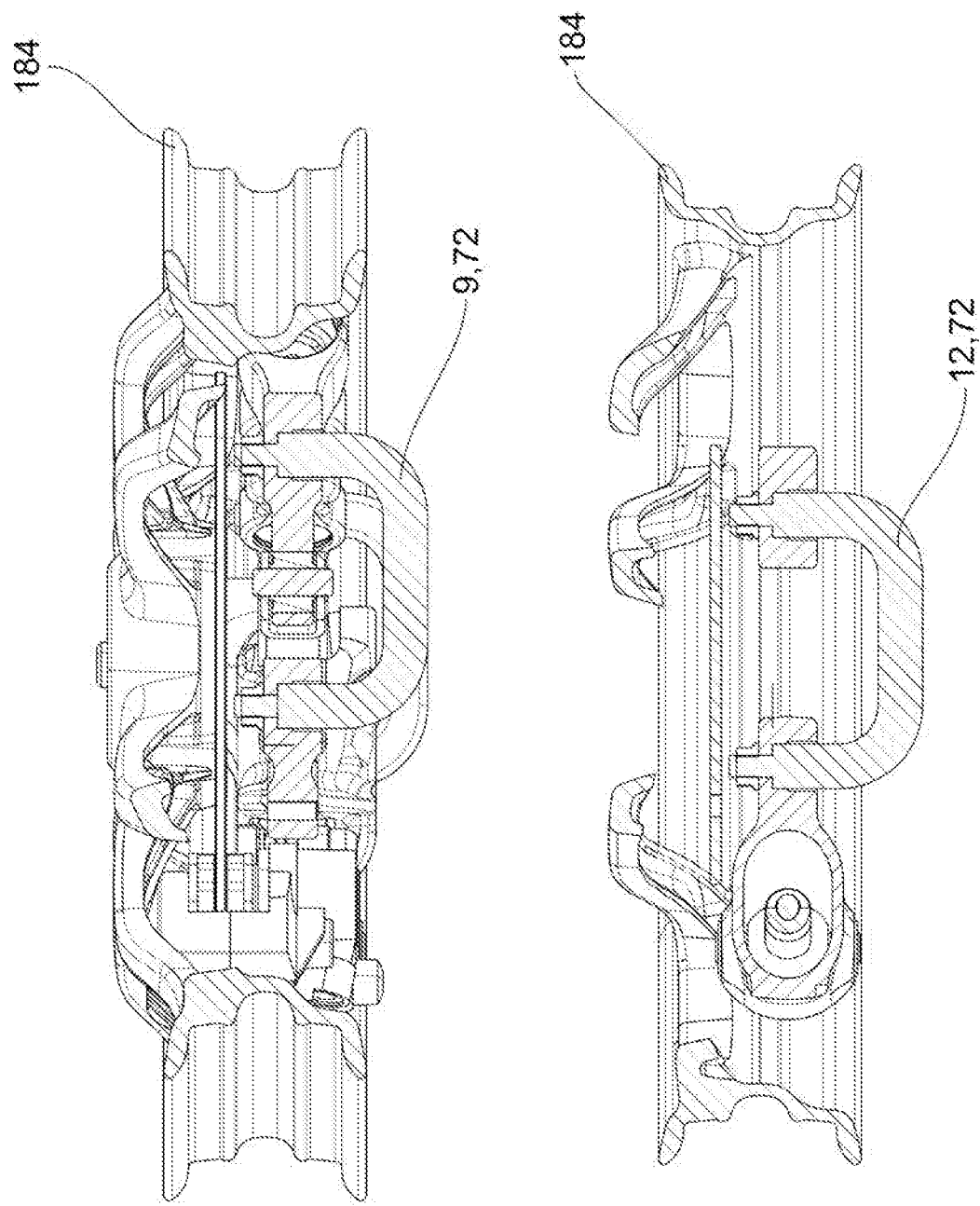
FIG. 14 shows sectional views of the wheel of FIG. 13.
Figure 15:
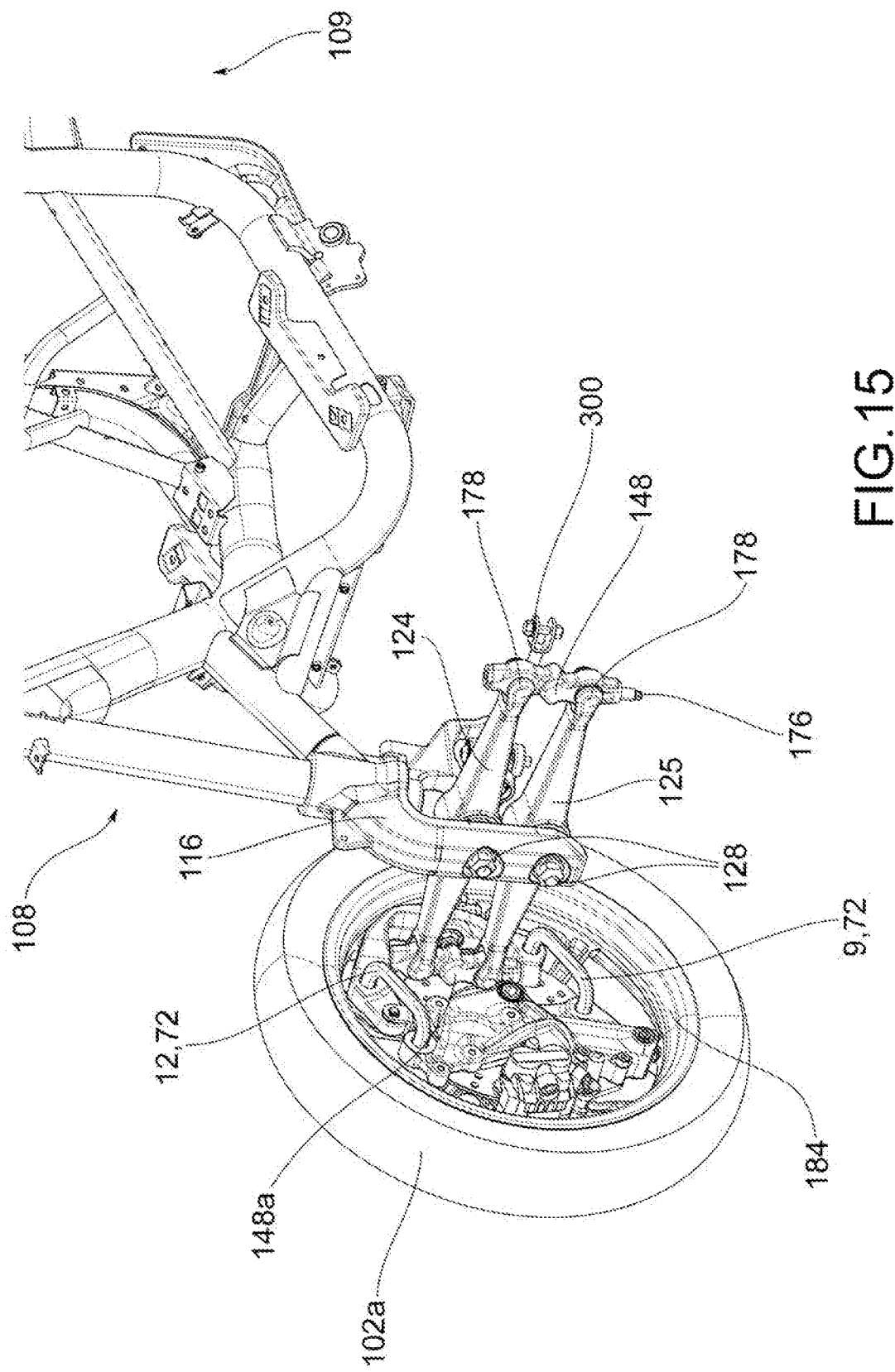
FIG. 15 shows a partial perspective view of a motorcycle comprising a front end according to a further embodiment of the present invention.
Figure 16:
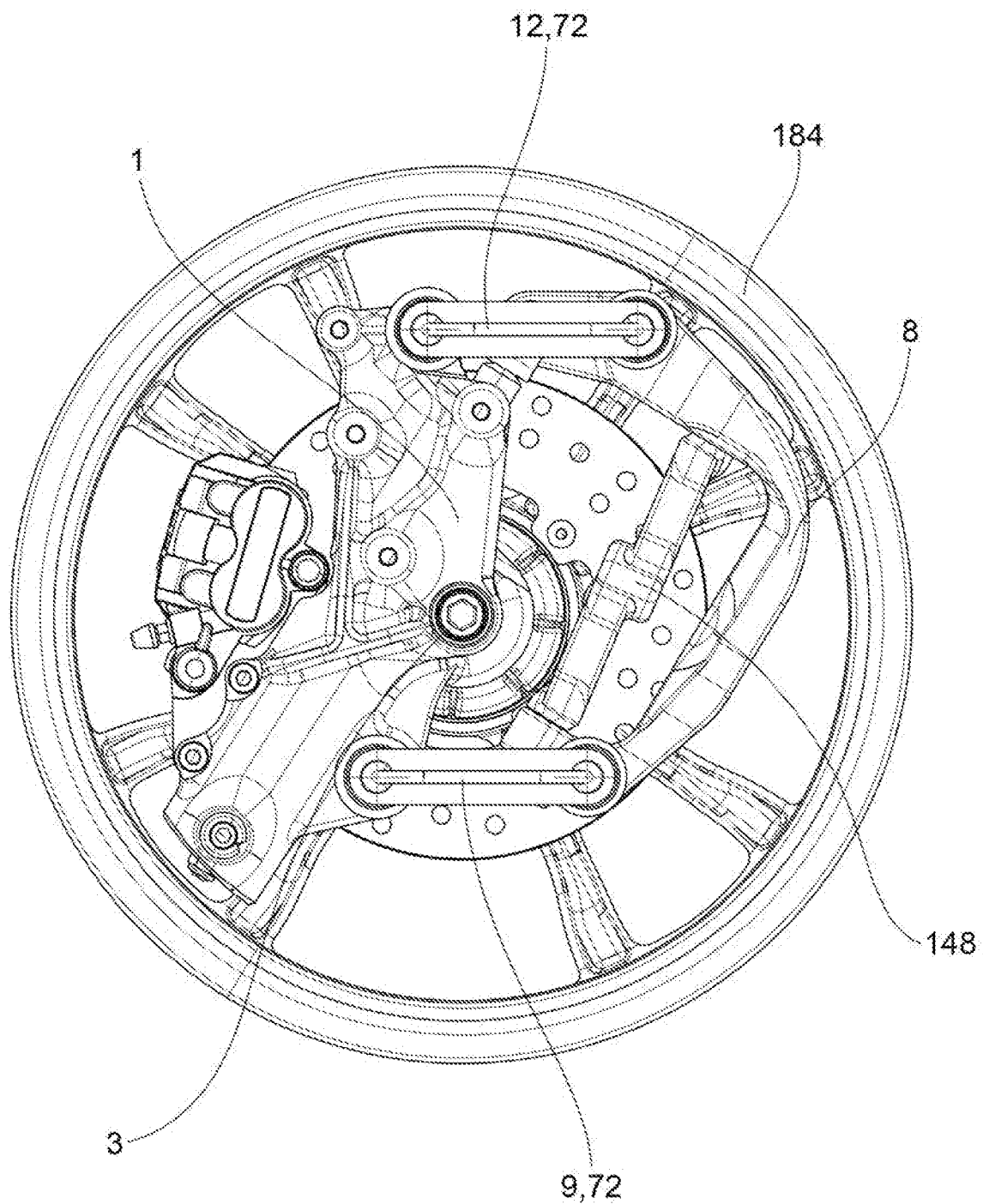
FIG. 16 shows a front view of a front wheel of the motorcycle of FIG. 15.
Figure 17:
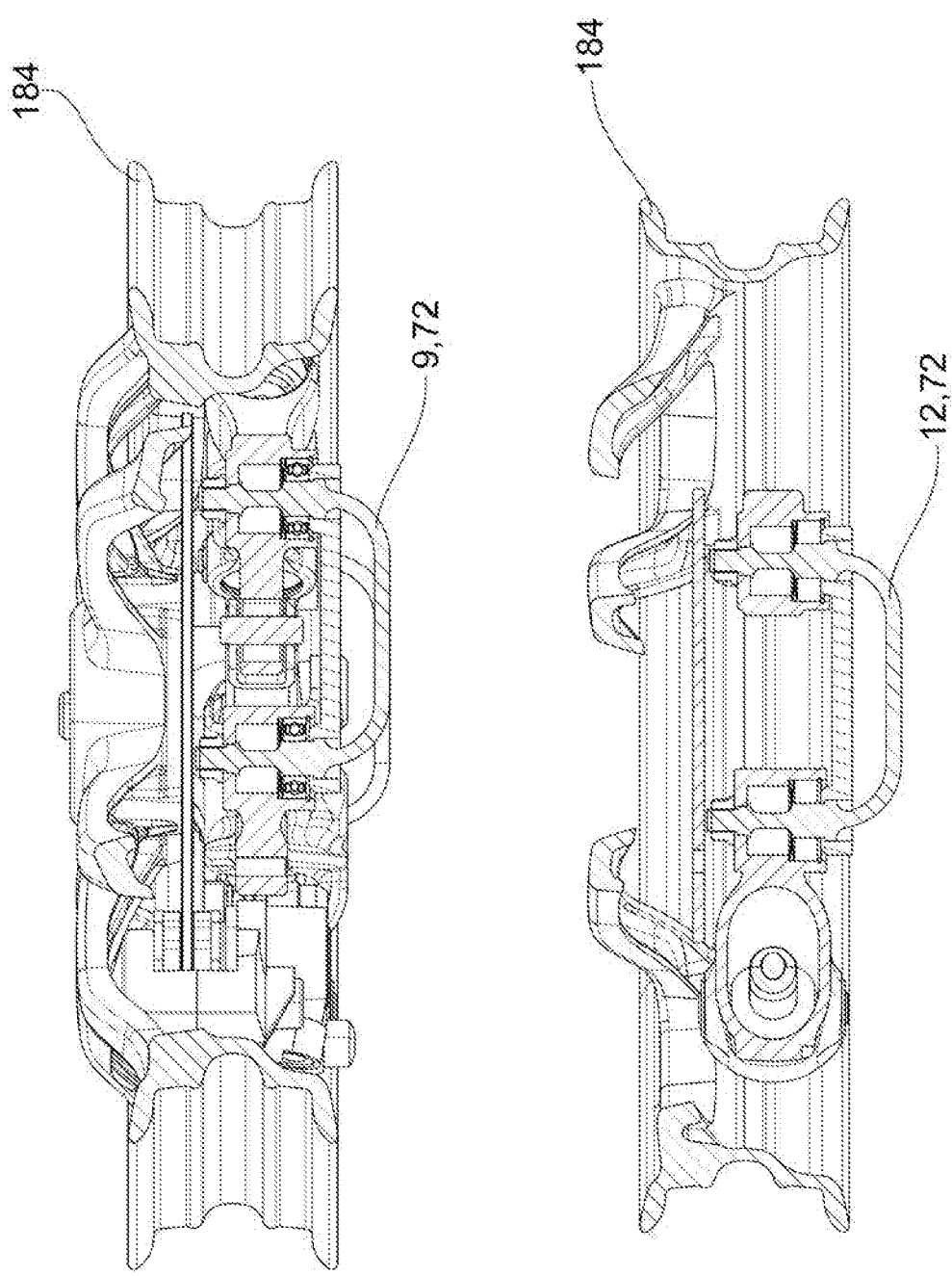
FIG. 17 shows sectional views of the wheel of FIG. 16.

The tubular jacket 4, again as shown in the section of FIG. 3 or in FIG. 5, comprises, at the first end 1a, a slot 6, which extends for at least one section along the longitudinal axis T-T.

The jacket 4 is shaped to contain the shock absorber group 7 in the space 5 (FIG. 3). The shock absorber group 7 comprises a damper 71, functionally coupled to a spring 72, both contained in the space 5.

In an alternative embodiment, the space 5 houses only the damper 71 while the spring 72, functionally coupled to the latter, is disposed on the outside.

In particular, the damper 71 and the spring 72, coupled together, define a fixed base portion 7a, fitted by means of a threaded connection to the jacket 4, and a movable head portion 7b opposite to the fixed portion 7a. The moving head portion 7b is adapted to slide within the space 5 of the jacket 4, according to the longitudinal axis T-T.

On the opposite side, at the first end 1a, the support arm 8 comprises a guide rod 11 which extends from the support arm 8 and is keyed with the moving head portion 7b of the shock absorber group 7. The guide rod 11 moves in the slot 6, which defines the travel thereof, following the sussultatory movements of the shock absorber group 7, transmitted by the wheel 102,102a.

As better shown in FIGS. 4 and 5, in an extended configuration of the shock absorber group 10 the guide rod 11 is found at the first end 1a. In a compression stage of the shock absorber group 7 (FIG. 5), the guide rod 11 moves towards the second end 1b, as described in detail below.

The second crank 12 guides the translation of the movable head portion 7b along said tubular jacket 4 along a sliding direction substantially coaxial to said longitudinal axis T-T.

The second crank 12 has the driving function; in other words, it allows the shock absorber group 7 to move coaxially to the tubular jacket, i.e. coaxially to the longitudinal axis T-T which represents the suspension axis.

In this way, the configuration of the quadrilateral suspension ensures a better control of the wheel trajectory fixed to the wheel guide of the shock absorber, as well as greater strength and therefore reliability.

In functional terms, the first crank 9—positioned below—acts as a support especially in the transverse direction, while the second crank 12—positioned above—acts as a guide for the trajectory and reaction to the braking force which is discharged on the wheel guide 1.

Figure 3A:
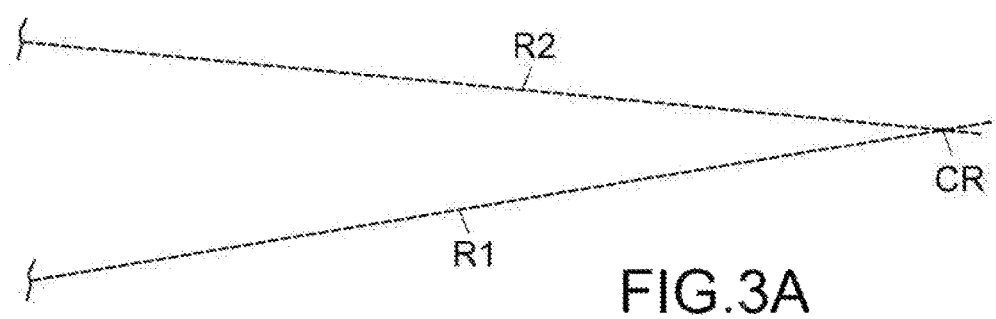
FIG. 3A is a detailed schematic view of FIG. 3.

In particular, the second crank 12 has a dimensional ratio with respect to the first crank 9 which defines a configuration of the suspension quadrilateral such that the instantaneous center of rotation converges substantially to infinity, or in another configuration—as shown schematically in FIGS. 3 and 3A—an instantaneous center of rotation CR converging in a finite point from the side external to the support arm 8.

In particular, the instantaneous center of rotation CR is defined by a first straight line R1 passing through the first 9a and the second hinge 9b of the first crank 9, and by a second line R2 passing through the third hinge 12a and the fourth hinge 12b of the second crank 12. FIG. 3A shows the intersection point of the lines R1 and R2 shown in FIG. 3, i.e. the instantaneous center of rotation CR of the suspension.

Constructively, in a preferred embodiment, as shown in FIG. 4, the second crank 12 is a flatly shaped element provided with respective holes passing through the ends corresponding to the attachment hinges 12a, 12b with the support arm 8 and the wheel guide 1. At least one bearing or bushing is inserted in the through holes, on which a respective pin 12c (FIG. 5), 12d (FIG. 3) is keyed.

The third hinge 12a comprises an attachment portion formed on the support arm 8 which extends as a branch 8a thereof. In particular, the attachment portion 8a has a "U" shape with opposing side attachment walls 8b opposite each other, so that the end of the second crank 12 is contained between the attachment walls 8b and the associated pin 12c is functionally supported by the side walls 8b.

In other constructive aspects, the first crank 9 consists of two distinct elements 9,9' parallel to each other which couple with the support arm 8 and the wheel guide 1 at the first 9a and second 9b hinge on opposite sides, the one from the other.

Preferably, braking means 154,155, for example a caliper 154 for a disk brake 155, of the corresponding wheel are fixed to each wheel guide 1. For the purposes of the present invention, the braking means 154, 155 may be of any type; preferably, said braking means 154, 155 are positioned and sized so as to enter within the volume 180 delimited by the rim 184 of each wheel 102,102a (FIG. 3).

The wheel guide 1 comprises special eyelets 157 (FIG. 4) formed on the jacket 4, to allow the fixing of the brake caliper 154 to the wheel guide 1.

The suspension group 10 described above is applied to each wheel group 102, 102a of the front end 108 of the three-wheeled motor vehicle 100 of FIG. 2a, as described below.

Figure 2B:
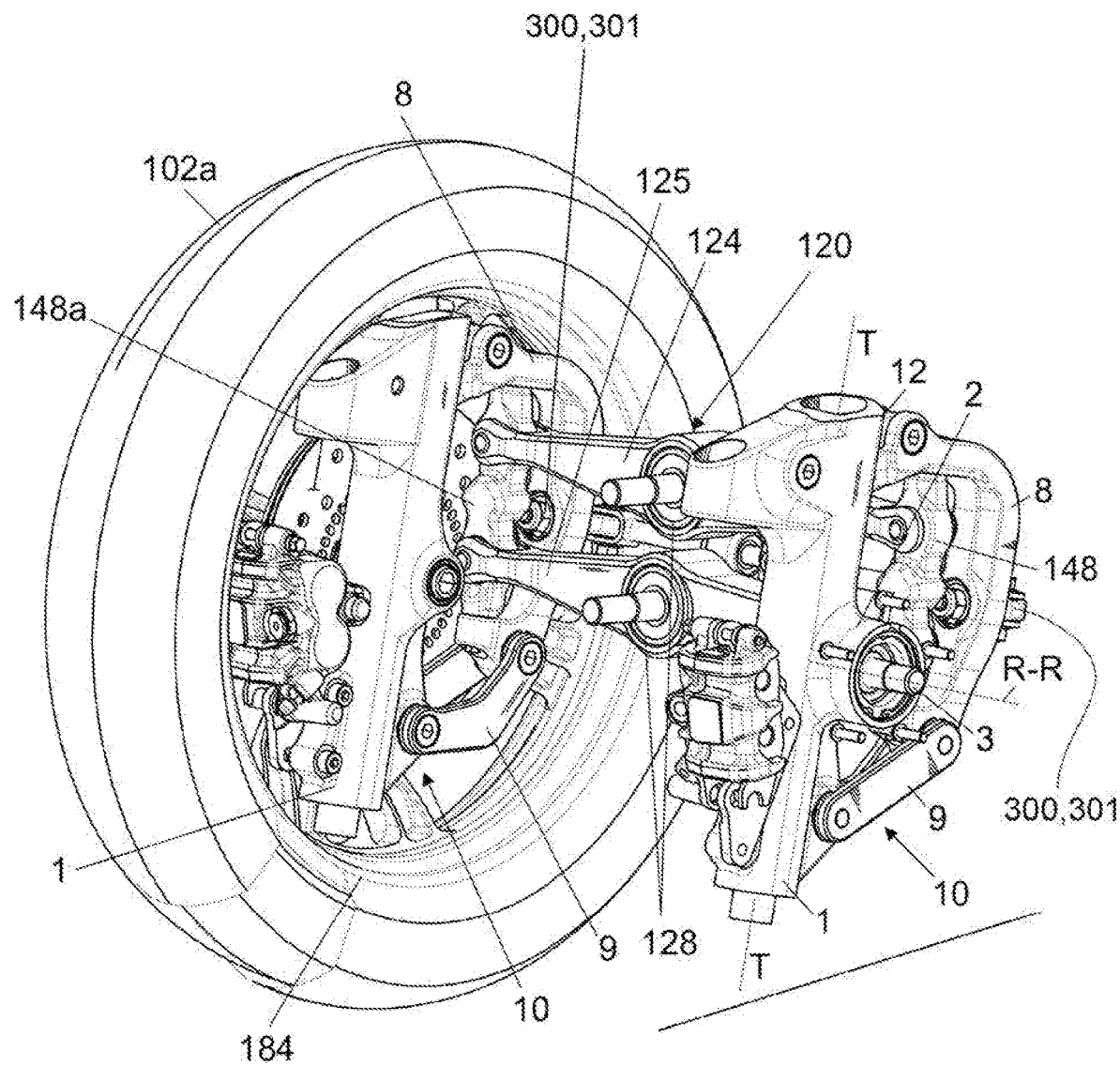

In particular, the suspension group 10 is entirely contained within a volume 180 delimited by a rim 184 of each wheel 102,102a (FIG. 3). The suspension groups 10 of the front wheels 102 and 102a face each other from the inside of the respective wheel (FIG. 2). In other words, the suspension groups 10 are turned toward the centerline plane M-M of the motor vehicle, and the related components associated with the stub axle are not directly visible to an external observer.

As better shown in FIG. 5, the support arm 8 comprises a support upright 148,148a.

The support upright 148,148a is integrated inside the support arm 8 and extends between the first end 1a and the second end 1b. The support upright 148,148a defines a branch of an articulated quadrilateral 120 and is bound to the latter by means of respective steering hinges 176. The steering hinges 176 define respective steering axes S-S of the wheels 102,102a, parallel to one another.

The articulated quadrilateral 120 further comprises an upper cross member 124 and a lower cross member 125. The pair of cross members 124 and 125 are hinged to the front end chassis 116 at middle hinges 128. (FIG. 2) Furthermore, the cross members 124 and 125 are connected to the corresponding ends by means of corresponding rolling hinges 178.

The articulated suspension quadrilateral of the suspension group 10 may rotate about axes of the respective support uprights 148, 148a to allow the steering of the motor vehicle. Said articulated suspension quadrilaterals are placed in rotation through a rod (single or articulated) 300, which is hinged at a preferably spherical hinge 301 with the support arm 8.

Said rod 300 is then functionally connected to the steering of the motor vehicle to actuate the steering. The rolling of the motor vehicle is therefore determined by the rolling quadrilateral 120, while the steering is permitted by the rotation of the suspension quadrilateral with respect to the rolling quadrilateral 120, about said axes of the support uprights 148, 148a, also called steering hinges 176.

As may be appreciated from the foregoing, the present invention overcomes the disadvantages of the prior art.

Advantageously, the present invention improves the dynamic behavior of the vehicle and improves the reliability of the suspension making it simpler constructively, with respect to the solutions of the prior art.

The above description of embodiments of the invention is able to show the invention from the conceptual point of view so that others, using the known art, will be able to modify and/or adapt such specific embodiments in various applications without further research and without departing from the inventive concept, and, therefore, it is meant that such adaptations and/or modifications will be considered as equivalent to specific embodiments. The means and materials for carrying out the various functions described may be of various kinds without departing from the scope of the invention. It is understood that the expressions or terminology used are purely descriptive and, therefore, not imitative.

The invention claimed is:

1. A suspension group of a motorcycle, wherein said suspension group comprises:
   a wheel guide, which extends along a longitudinal axis, which comprises a wheel attachment for connection to a rotation pin of a wheel having a rotation axis orthogonal to said longitudinal axis;
   wherein the wheel guide extends between a first end and a second end, opposite the first end,
   a support arm functionally connected to the wheel guide respectively by means of:
      a first crank pivotally connected at said second end to the wheel guide and to the support arm; and
      a second crank pivotally connected at said first end to the wheel guide and to the support arm;
   wherein the wheel guide, the support arm and the first and second crank define a suspension quadrilateral;
   wherein, between at least two of said elements chosen between the wheel guide, the support arm, the first and the second crank, a shock absorber group is interconnected such that the shock absorber group varies its extension when the movement of the suspension quadrilateral varies; and
   wherein said suspension quadrilateral is contained within a volume delimited by a rim of said wheel.

2. A suspension group of a motorcycle according to claim 1, wherein the shock absorber group is provided between said first crank and said second crank.

3. A suspension group of a motorcycle according to claim 1, wherein the shock absorber group is provided between said first crank and said support arm.

4. A suspension group of a motorcycle according to claim 1, wherein the shock absorber group is provided between said first crank and said wheel guide.

5. A suspension group of a motorcycle according to claim 1, wherein the shock absorber group is provided between said second crank and said support arm.

6. A suspension group of a motorcycle according to claim 1, wherein the shock absorber group is provided between said support arm and said wheel guide.

7. A suspension group of a motorcycle according to claim 1, wherein said shock absorber group comprises resilient means and a damper.

8. A suspension group of a motorcycle according to claim 1, wherein said shock absorber group is shaped so as to compress as the load on the wheel increases.

9. A suspension group of a motorcycle according to claim 1, wherein said shock absorber group is shaped so as to extend as the load on the wheel increases.

10. A suspension group of a motorcycle according to claim 1, wherein the first crank is rotatably connected at said second end, by means of a first hinge arranged on the wheel guide, and a second hinge arranged on the support arm, and wherein the second crank is pivotally connected at said first end, by means of a third hinge disposed on the support arm, and by means of a fourth hinge disposed on the wheel guide.

11. A suspension group of a motorcycle according to claim 1, wherein the shock absorber group is arranged at least partially outside said volume.

12. A suspension group of a motorcycle according to claim 1, wherein the shock absorber group is disposed completely outwardly or cantilevered with respect to the volume of said rim.

13. A suspension group of a motorcycle according to claim 7, wherein the shock absorber group comprises only one damper, and first and second hinges of the first crank are rigid or interlocking such that the first crank acts as a torsion bar carrying out the function of said resilient means.

14. A suspension group of a motorcycle according to claim 12, wherein the third and fourth hinges of the second crank are rigid or interlocking so that the second crank acts as a torsion bar carrying out the function of said resilient means.

15. A suspension group according to claim 1, wherein the second crank has a dimensional relationship with respect to said first crank that defines a quadrilateral suspension configuration such that the instantaneous center of rotation converges substantially to infinity.

16. A suspension group according to claim 1, wherein the second crank has a dimensional relationship with respect to said first crank that defines a quadrilateral suspension configuration such that the instantaneous center of rotation converges in a finite point from the side of said support arm.

17. A suspension group of a motorcycle according to claim 1, wherein the wheel guide comprises a tubular jacket which defines a housing space, wherein the shock absorber group is housed at least partially in said housing space.

18. A wheel group of a motorcycle comprising a suspension group according to claim 1.

19. A front end of a motorcycle that comprises:
a front end chassis,
a pair of front wheels kinematically connected to the front end chassis by means of a rolling articulated quadrilateral,
wherein said front end comprises, at each front wheel, a suspension group according to claim 1.

20. A motorcycle comprising a drive wheel at the rear axle and a front end according to claim 19.

* * * * *